United States Patent
Yang et al.

(10) Patent No.: US 7,354,478 B2
(45) Date of Patent: Apr. 8, 2008

(54) INSULATION PRODUCT HAVING BICOMPONENT FIBER FACING LAYER AND METHOD OF MANUFACTURING THE SAME

(75) Inventors: Alain Yang, Bryn Mawr, PA (US); Thomas A. Cuthbertson, Royersford, PA (US); Mark Trabbold, Harleysville, PA (US)

(73) Assignee: CertainTeed Corporation, Valley Forge, PA (US)

( * ) Notice: Subject to any disclaimer, the term of this patent is extended or adjusted under 35 U.S.C. 154(b) by 217 days.

(21) Appl. No.: 10/783,494

(22) Filed: Feb. 20, 2004

(65) Prior Publication Data

US 2005/0186877 A1    Aug. 25, 2005

(51) Int. Cl.
B05C 19/00 (2006.01)
B05C 5/00 (2006.01)
B05C 13/02 (2006.01)
B32B 37/00 (2006.01)

(52) U.S. Cl. .................. 118/308; 118/325; 118/60; 118/641; 118/304; 156/499

(58) Field of Classification Search ........ 118/641–643, 118/59–60, 304, 308, 324, 325, 420, DIG. 5; 156/499, 555, 62.4, 62.6, 276, 279, 582, 156/583.1; 264/112–113, 116; 406/171, 406/168; 427/185
See application file for complete search history.

(56) References Cited

U.S. PATENT DOCUMENTS

| | | | |
|---|---|---|---|
| 2,543,101 A | * | 2/1951 | Francis, Jr. .............. 442/278 |
| 2,744,045 A | * | 5/1956 | Collins .................... 264/115 |
| 5,432,000 A | * | 7/1995 | Young et al. ............ 428/372 |
| 5,642,601 A | | 7/1997 | Thompson, Jr. et al. |
| 6,357,504 B1 | | 3/2002 | Patel et al. |

FOREIGN PATENT DOCUMENTS

WO    WO 94/29540 A1    12/1994

OTHER PUBLICATIONS

Schmid Corporation, Cavitec product brochure, Online Catalog © 2003, 2 pages.
Caviscat Laminating Plants brochure, Cavitec AG, Münchwilen, Switzerland, 2 pages, no date.
Rockwood Silk brochure, Rockwell A/S, Hedehusene, Denmark, 2 pages, no date.
"Bicomponent Fibers for Airlaid" and "PET Fibers for Airland," KoSa Textile Staple Nonwovens brochure, © 1999, 2 pages.
Celbond® Bicomponent brochure, KoSa Textile Staple Nonwovens, © 1999, 2 pages.
"Bicomponent Fibers" www.kornon.com, 5 pages, no date.

* cited by examiner

Primary Examiner—Yewebdar Tadesse
(74) Attorney, Agent, or Firm—Duane Morris LLP

(57) ABSTRACT

An insulation product is provided comprising an insulation sheet containing randomly oriented fibers bonded together. The sheet has first and second major surfaces and a pair of side portions. A nonwoven facing layer is bonded to at least one of the major surfaces. The nonwoven facing layer comprises randomly oriented bicomponent fibers, each of the bicomponent fibers including first component and second component portions. The nonwoven facing layer is bonded to the at least one major surface at least in part by a meltbond between the first component portion of the bicomponent fibers and the randomly oriented fibers in the insulation sheet.

20 Claims, 2 Drawing Sheets

INSULATION PRODUCT HAVING BICOMPONENT FIBER FACING LAYER AND METHOD OF MANUFACTURING THE SAME

FIELD OF THE INVENTION

The present invention relates to insulation products and more specifically to insulation products having facing layers.

BACKGROUND OF THE INVENTION

Batt insulation is commonly manufactured by fiberizing mineral fibers from a molten mineral bath by forcing them through a spinner rotating at a high number of revolutions per minute. The fine fibers are then contacted by a pressurized hot gas to draw the fibers to a useable diameter and length. The fibers are typically sprayed with a phenolic resin binder. The fibers are then collected and distributed on a conveyor to form a mat. The resin is then cured in a curing oven. The mat is then sliced into lengthwise strips having desired widths and chopped into individual batts. In some cases, a facing material, such as Kraft paper coated with a bituminous material or other vapor retarder, is added to the mat prior to the cutting step.

One of the known problems associated with installing glass fiber insulation materials is that they generate glass particle dust, which can be a cause of irritation to the skin of workers, and also can be inhaled. One way to reduce glass dust is to encapsulate insulation batts with a facing that reduces dust, but which is porous, and vapor permeable. W094/29540, assigned to Owens Corning Fiberglas Corporation, teaches a polymeric facing which is adhered to one or both major surfaces of the batt with a fastening means, such as a small amount of adhesive material. The adhesive material is of a sufficiently small amount so as to enable the insulation batt not to exceed a flame spread rating of 25 using the ASTM E-84 flame spread test. The adhesive should be applied in sufficient quantity to bond the facing to the mineral fiber batt and enable the batt to be picked up and handled by the facing. The facings described in this reference are suggested to be a polypropylene or polyethylene material, which is adhered, stuck or heat sealed to the major surfaces of the batt.

Knapp et al., U.S. Pat. No. 5,848,509 commonly assigned with the instant application, teaches encapsulated glass fiber insulation within a nonwoven covering material. The nonwoven covering is disposed over the top surface of a mineral fiber core and extends adjacent the side surfaces. The covering is preferably formed from a web of nonwoven material, such as polyester, polypropylene, polyethylene or rayon, and is preferably applied to the top and sides of the glass fiber mat with a hot melt or suitable adhesive.

In order to provide insulation mats with encapsulated nonwoven coverings or films, a manufacturer needs multiple sizes of encapsulation materials for different product sizes. This can contribute greatly to the cost of the product since the inventory of different sized nonwoven fabrics must be stored and transported whenever needed. Additionally, quantities of adhesive must also be stored for adhering these coverings to batt insulation. Many adhesives and glues have a limited shelf life. Additionally, spraying these adhesives on batt surfaces requires constant cleanup and maintenance of manufacturing equipment and the work area.

Accordingly, there remains a need for an encapsulated or faced insulation material that can be made less expensively, but that still reduces dust and permits air evacuation when the insulation product is compressed for packaging as well as a method of manufacturing the same.

SUMMARY OF THE INVENTION

An insulation product is provided comprising an insulation sheet containing randomly oriented fibers bonded together. The sheet has first and second major surfaces and a pair of side portions. A nonwoven facing layer is bonded to at least one of the major surfaces. The nonwoven facing layer comprises randomly oriented bicomponent fibers, each of the bicomponent fibers including first component and second component portions. The nonwoven facing layer is bonded to the at least one major surface at least in part by a meltbond between the first component portion of the bicomponent fibers and the randomly oriented fibers in the insulation sheet.

A method of manufacturing an insulation product is also provided. An insulation sheet is formed containing randomly oriented fibers bonded together. The sheet has first and second major surfaces and a pair of side portions. A layer of bicomponent fibers is applied to at least one of the major surfaces. Each of the bicomponent fibers includes first component and second component portions. At least a portion of the layer is meltbonded to the at least one of the major surfaces.

The insulation product of the present invention includes a nonwoven layers produced in situ on one or more surfaces of the insulation sheet. In situ forming through deposition of bicomponent fiber and subsequent processing, is extremely efficient, requires less inventory, and produces an air permeable, smooth, durable and water vapor permeable surface that is particularly desirable for an inorganic fiber insulation product. Improved adherence of the nonwoven layer to the insulation sheet may also be achieved.

A nonwoven facing layer for an insulation product is also provided. The nonwoven facing layer includes randomly oriented bicomponent fibers, each of the bicomponent fibers including first component and second component portions, wherein the second component portion has a higher melting point than the first component portion.

Still further, a system for manufacturing an insulation product is provided. The system includes a conveyor for conveying an insulation sheet containing randomly oriented fibers bonded together and means for applying a layer of bicomponent fibers to at least one of the major surfaces of the sheet. Each of the bicomponent fibers includes first component and second component portions. The system also includes a heater disposed to heat the layer, thereby forming a nonwoven layer meltbonded to the at least one of the major surfaces of the insulation sheet.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

Provided herein are methods for manufacturing faced insulation products and the faced insulation products made thereby. Insulation materials generally span the range from light weight, flexible and resiliently compressible foams and nonwoven fiber webs to rigid or semi-rigid boards. Generally, these insulating materials have densities in the range of about 0.5-7 lb/ft$^3$ (8-112 kg/m$^3$). Foam and nonwoven fiber web materials are usually provided in continuous sheeting that is sometimes cut to preselected lengths, thus forming batts. These articles are usually characterized as "low density," having a density in the range of about 0.5-6 lb/ft$^3$ (8-96 kg/m$^3$), and preferably about 1-4 lb/ft$^3$ (16-64 kg/m$^3$), and more preferably 0.3 to 1.5 lb/ft$^3$ (4.8-24 kg/m$^3$). The thickness of the insulation blanket or mat is generally proportional to the insulated effectiveness or "R-value" of the insulation. These low density insulation mats typically have a thickness between about 3.5-10 inches.

In contrast, rigid to semi-rigid insulation boards ("high density" insulation) tend to have densities in the higher portion of the range, at about 2-7 lb/ft$^3$ (32-112 kg/m$^3$), and preferably at about 4-7 lb/ft$^3$ (64-112 kg/m$^3$). These boards customarily are produced as sheets typically having a thickness in the range of about 0.25-2 inches, and more preferably about 0.5-2 inches, and about 2-4 feet wide by about 4-12 feet in length.

Figure 1:
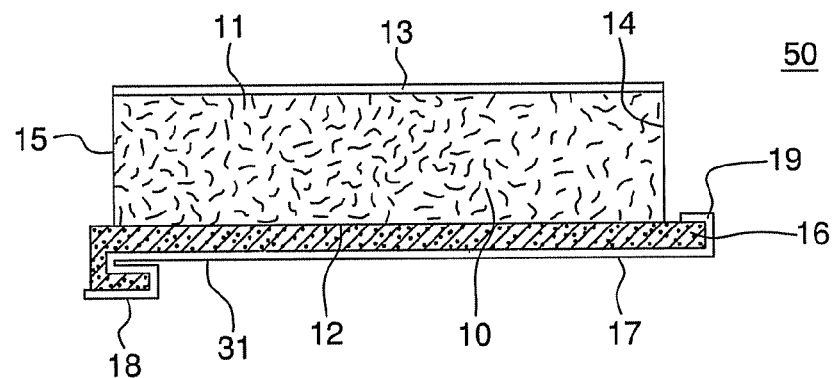
FIG. 1 is a side elevational view of an insulation product according to the present invention.

With reference to the Figures, and more particularly to FIG. 1 thereof, insulation product 50 is shown. Insulation product 50 includes insulation sheet 10, which may comprise a high or low density insulation mat or board, as described above, formed from organic fibers such as polymeric fibers or inorganic fibers such as rotary glass fibers, textile glass fibers, stonewool (also known as rockwool), or natural fibers, such as hemps, kenaf, bagasse, ramie and animal wool, or a combination thereof. Mineral fibers, such as glass, are preferred. In some embodiments, a vapor retarder facing layer 17, which may be a cellulosic paper, typically formed from Kraft paper, coated with a bituminuous adhesive material, such as asphalt, or polymeric film, such as LDPE (low density polyethylene), is provided on one major surface 12 of the insulation sheet 10. The facing layer 17 and bituminous layer 16 together form bitumen-coated Kraft paper 31. The coating is preferably applied in a sufficient amount so as to provide an effective barrier or retarder for water vapor, for example, so as to reduce the water vapor permeability of the Kraft paper to no more than about one perm when tested by ASTM E96 Method A test procedure. In other forms, where a vapor retarder or barrier is not desired, insulation sheet 10 can have no facing on its second major surface 12 or a nonwoven facing layer as described below. Optionally, the facing layer 17 can be secured to the bottom of major surface 12 of the insulation sheet 10 by an adhesive, such as a hot-melt adhesive.

Insulation product 50 may include a pair of optional side tabs 18 and 19 that can be unfolded and fastened to wooden or metal studs, for example. Various known configurations for side tabs or flaps 18 and 19 are known. Alternatively, there can be no tabs on the Kraft facing. The facing layer 17 can be water vapor impermeable or permeable, depending on its makeup, degree of perforation and intended use.

Insulation sheet 10 is typically formed from glass fibers, often bound together with a heat cured binder, such as known resinous phenolic materials, like phenolformaldehyde resins or phenol urea formaldehyde (PUFA). Melamine formaldehyde, acrylic, polyester, urethane and furan binder may also be utilized in some embodiments. The insulation is typically compressed after manufacture and packaged, so as to minimize the volume of the product during storage and shipping and to make handling and installation of the insulation product easier. After the packaging is removed, the batt insulation product 50 tends to quickly "fluff up" to its prescribed thickness for insulation.

Figure 2:
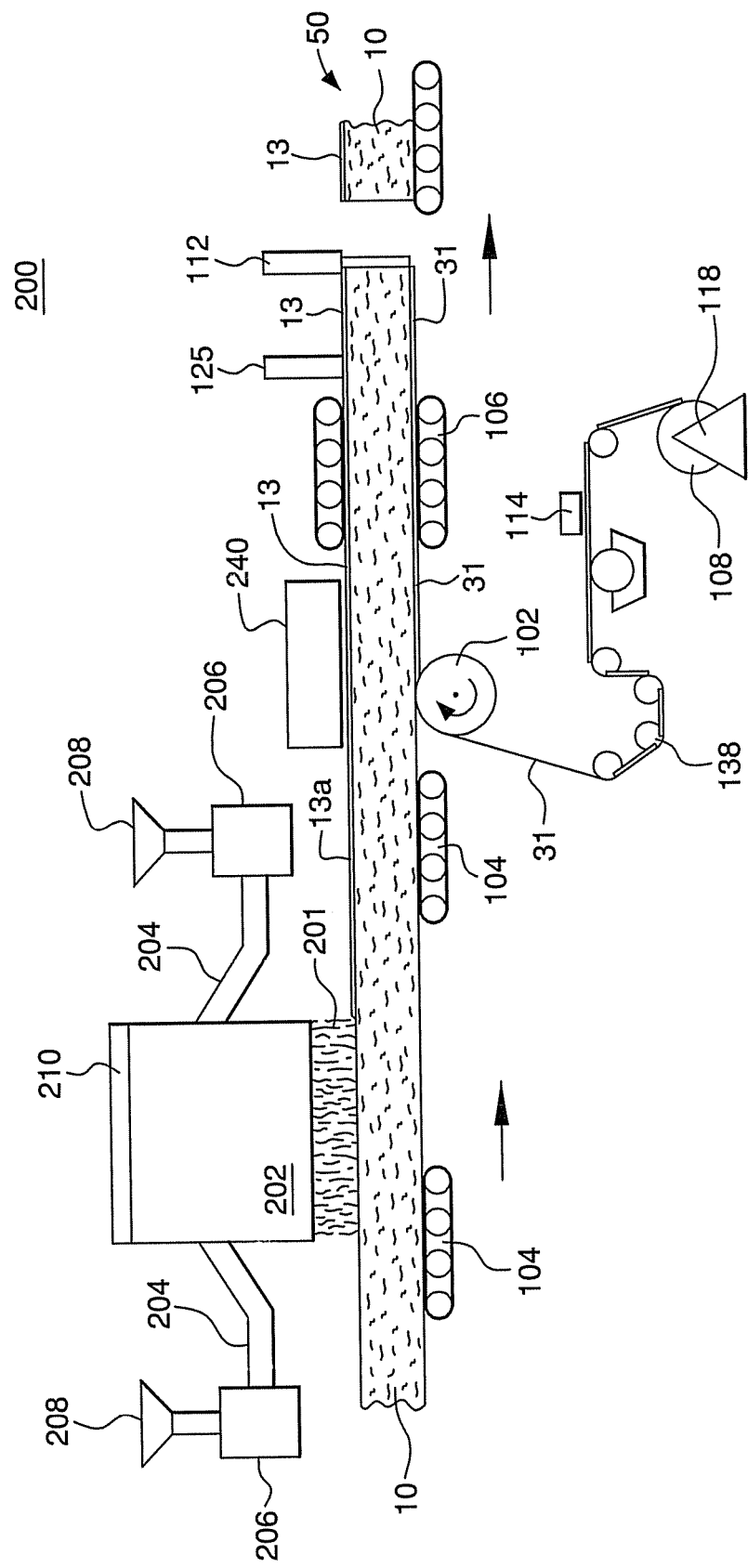
FIG. 2 illustrates an exemplary embodiment of an insulation product manufacturing system and method for making the insulation product of FIG. 1.

While in an un-encapsulated insulation product, exposed surfaces can make installation troublesome, and often release unbound fibers and dust into the working environment, the present invention employs a nonwoven layer 13 that protects at least the first major surface 11 of the insulation sheet 10. Alternatively, the nonwoven layer can coat one or both side surfaces 14 and 15, and even part or all of the second major surface 12, to dramatically reduce the release of unbound fibers and dust. In further embodiments, the nonwoven layer can be applied to the cut end surfaces, after the chopper 112 step (FIG. 2).

The nonwoven layer 13 preferably comprises a layer of randomly oriented bicomponent fibers. Bicomponent fibers are generally formed when two polymers are extruded from the same spinnerette with both polymers contained within the same filament. Bicomponent fibers allow for exploitation of capabilities not existing in either polymer alone. In one embodiment, the bicomponent fibers that form layer 13 each have a first sheath component portion that surrounds a core material second component portion, but other configurations are certainly contemplated, such as the so-called "side-by-side" configuration where two connected components lie side-by-side or "islands-in-the-sea" fibers where areas of one polymer can be found in the matrix of a second polymer. In some embodiments, cospun fibers, which include a group of filaments of different polymers but a single component per filament, spun from the same spinnerette, may be used. "Bicomponent fiber" as used herein means both traditional bicomponent fibers described above and their close relatives, e.g., cospun fibers.

In one embodiment, the first component portion, such as the sheath portion, is formed from a material that has a lower melting point than the second component portion, such as the core material. When melted and cooled, the first component portion of each fiber forms a meltbond with the other bicomponent fibers and with the fibers of the insulation sheet 10, thereby simultaneously forming and affixing layer 13 to sheet 10 as a facing layer.

The first and second component materials may be selected from the group consisting of polyethylene, polypropylene, polyester, polyethylene terephthalate, polybutylene terephthalate, polycarbonate, polyamide, polyphenylene sulfide, polyolefin, PET (polyester) PEN polyester, nylon 6,6 PCT polyester, polypropylene PBT polyester, nylon 6 co-polyamides, polylactic acid polysterene, acetal polyurethane, and soluble copolyester HDPE, LLDPE. In one embodiment, the first low melting temperature component portion is polyester and the second higher melting temperature component portion is polyethylene. In one further embodiment, the melting point of the first component portion (e.g., sheath) is between about 110° and 180° Centigrade and the melting point of the second component portion (e.g., core) is above about 260° Centigrade.

The bicomponent fibers preferably have lengths of less than about 1.0 inch, and more preferably less than about 0.5 inch, to avoid tangling of the fibers and facilitate separation of the fibers during deposition. In some embodiments described below, however, bicomponent fibers having lengths of even up to about 5.0 inches may be used.

In one exemplary embodiment, the bicomponent fibers of layer 13 include CELBOND® Type 255 2.0 denier bicomponent fibers available from KoSa Company of Houston, Tex. These fibers may be obtained in lengths of 0.16 and 0.25 inches, and have diameters between about 10-20 μm. The 0.16 inch fibers are preferred. The sheath polymer comprises a PET (polyester) material having a melting temperature of around 128° C. and the core is formed from a PE (polyethylene) material having a higher melting temperature than the sheath material. The core melting temperature is about 256° C.

A system and method for manufacturing the insulation product of FIG. 1 is described in connection with FIGS. 2 and 3. A sheet 10, which is already cured, is conveyed by conveyors 104, in the direction indicated, beneath a fiber deposition chamber 202 that deposits bicomponent fibers 201 onto the sheet 10 to form intermediate layer 13a. Bicomponent fibers are generally provided in a lose web form, such as in bale form. The bales of bicomponent fibers are provided from a source, such as hoppers 208, to blowers or condensers 206 for transport through corrugated piping 204 or other transport means to deposition chamber 202 for separation into individual fibers for deposit onto sheet 10.

Figure 3:
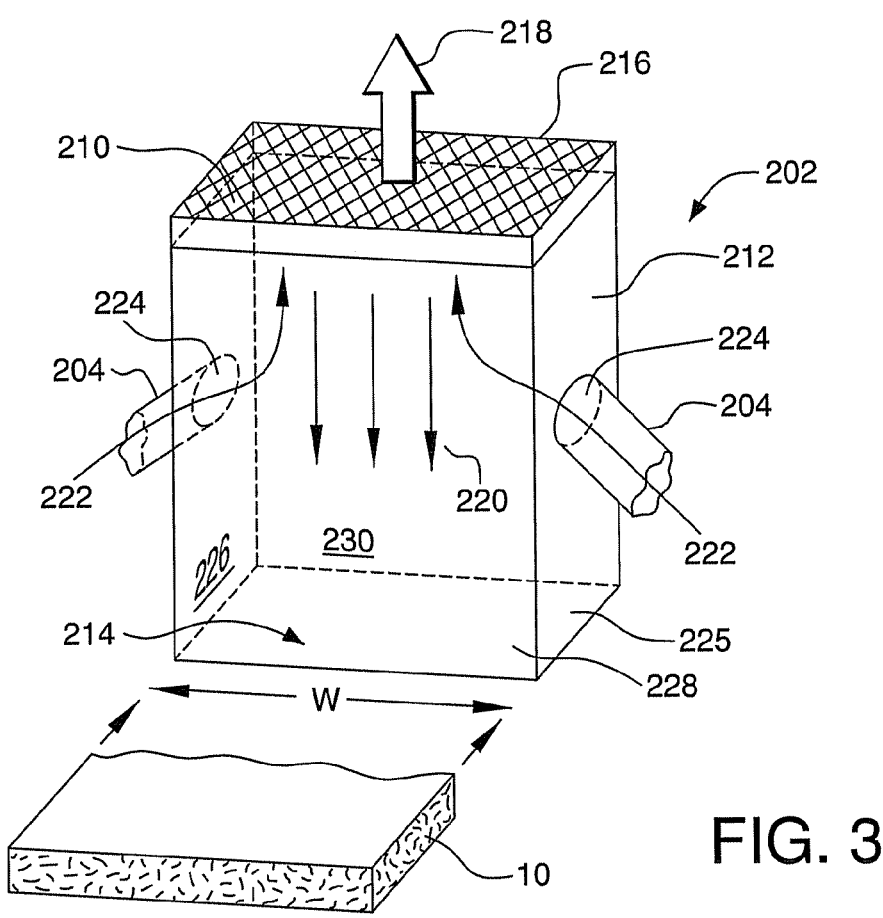
FIG. 3 is a perspective view of an embodiment of a fiber deposition chamber utilized in the system and method of FIG. 2.

FIG. 3. is a perspective view, shown partially in shadow, of the deposition chamber 202 of FIG. 2. Chamber 202 comprises a box structure having a side wall 212, open bottom 214 and top wall 216. Top wall 216 preferably includes a filter 210 having filter means (such as a nonwoven sheet) sized to allow air to escape through the top wall 216 of chamber 202 while blocking bicomponent fibers blown into the chamber 202 through pipes 204. A 1.5 g/ft² plastic non-woven sheet was used as a filter in the trial described below. Side wall 212 preferably includes at least one opening 224 that allows entry of bicomponent fibers from pipes 204 into chamber 202.

The preferred orientation of the chamber 202 relative to the sheet 10 is illustrated in FIG. 3. Chamber 202 preferably has a width W that is large enough to cover the width of the first major surface of the mat 10, whereon the bicomponent fibers 201 are deposited. In one embodiment, chamber 202 includes two openings 224 coupled to respective feed pipes 204 that are on respective sides 225 and 226 of the chamber 202 to evenly distribute the fibers across the width of the sheet 10. Of course, chamber 202 may also include bicomponent fiber entry openings on front and rear sides 228 and 230, respectively, or at other locations on wall 212, to improve fiber distribution.

Pipes 204 are preferably upwardly oriented such that the bicomponent fibers are introduced at a point at or above half of the height of the chamber 202 and in a stream (generally illustrated by arrows 222) directed toward top wall 216. Air (illustrated by arrows 218) escapes chamber 202 through filter 210, and the fibers are separated by turbulence within chamber 202, after which the fibers fall toward the bottom of chamber 202 (illustrated by arrows 220), through open bottom 214 and onto sheet 10 to form intermediate layer 13a.

Although chamber 202 is illustrated as having a generally rectangular shape, the chamber is not limited to rectangular shapes and other structures such as cylindrical, cubical or even irregular shapes may be utilized as long as the chamber 202 has sufficient volume to allow the bicomponent fibers to separate and sediment to form a layer 13a having the desired density and coverage area on a major surface of sheet 10. One or more fiber introduction points may be used to encourage the even sedimentation of the fibers onto sheet 10, as well as one or more deposition chambers 202.

The open bottom 214 of chamber 202 is preferably placed only slightly above the moving sheet 10, e.g., 1-3" above sheet 10, so that higher air flow resistance proximate to the moving sheet 10 forces air to escape from the top of the chamber 202 through filter 210 rather than from the open bottom 214, thereby allowing the fibers to fall on the surface of sheet 10 without significant loss from scattering of the fibers from the surface of sheet 10.

It is realized that increased fiber density in layer 13 can increase the quality of the nonwoven layer 13 formed on sheet 10, but increased fiber content also increases the cost of the overall product 50. In one embodiment, bicomponent fibers are deposited such that the fiber content of layer 13a is between about 0.5-2.5 grams per square foot (gr/ft²), and most preferably less than about 2.0 gr/ft². The fiber content can be controlled, for example, via the conveying speed of sheet 10, through the shape of the chamber 202 and/or by the amount of fiber introduced through openings 224.

The chamber configuration of FIG. 3 is preferred for fibers having lengths of 0.5" or less but may be used for fibers having lengths of up to about 4.0" or even longer. In one embodiment, with fibers longer than about 0.5" in length, a fine fiber opener (not shown), such as a saw-tooth licker-in drums opener model 920TS manufactured by DOA (Doctor Otto Angleitner) of Wels, Austria, may be installed between the blowing machines 206 and the hopper 208 to facilitate opening of the fibers.

Chamber 202 is only one example of a means for separating the bicomponent fibers provided in bale form into individual fibers, and other manners of separating the fibers for deposition in a relatively thin and uniform layer on the surface of sheet 10 may also be appropriate. In one alternative embodiment, a scatter machine is employed in place of the deposition chamber 202 above the sheet 10 as it is conveyed. The scatter machine uses a set of picking teeth disposed on rotating rolls that transmit the fibers from a hopper and deposit the fibers evenly on a moving surface in a selected quantity. Scatter machines are commonly used in precision applications, such as in forming automotive interiors, carpet backing lamination, shoe lining materials or high-quality composite materials. One example of a scatter machine is the CAVISCAT™ scatter coating system available from Cavitec AG of Münchwilen, Switzerland.

Referring again to system 200 of FIG. 2, after layer 13a is deposited on a major surface of sheet 10, it is conveyed by conveyors 104 to heat stage 240, where sufficient heat is applied from stage 240 via a heated roller, infra red heater or other heat source to melt the first, low melting temperature component of the bicomponent fibers, while leaving the core, higher melting temperature component intact, to form a meltbond between the bicomponent fibers and between the bicomponent fibers and the randomly oriented fibers of the sheet 10, thereby securing nonwoven facing layer 13 (after cooling) to sheet 10.

As also illustrated in FIG. 2, sheet 10 may be presented by the feed conveyer 104 to a heated roll 102, to which is simultaneously supplied a continuous web of bitumen-coated Kraft paper web 31, fed between the heated roll 102 and the sheet 10. The web of Kraft paper fed via roller 102 of FIG. 2 after being bitumen-coated is supplied from a roll 108 on payout stand 118, through an accumulator 138 for tensioning the Kraft paper web 31. In addition, the outside surface of the web can be marked at a marking station 114 with identifying information such as the R-value of the glass fiber sheet and the production lot code before the Kraft paper web 31 is applied to the bottom of the sheet 10. Optionally, the edges of the Kraft paper web 31 are folded over to form the side tabs 18, 19 (FIG. 1) just prior to the web contacting the heated roll 102. The Kraft paper web 31 is oriented so that the bitumen-coated side of the Kraft paper web 31 faces the bottom of the glass fiber sheet 10. The temperature is preferably selected to provide enough heat to soften the bituminous coating such that the bitumen-coated Kraft paper web 31 adheres to the underside of the glass fiber sheet 10. The faced glass fiber sheet is transported away from the heated roll 102 by a tractor section 106 and delivered to a chopper 112, which periodically chops the faced glass fiber sheet to form insulation product 112 of appropriate length, e.g., 48-105" for insulation batts and 32-100' for insulation rolls. Prior to or after facing the sheet 10 with facing layer 31, the sheet 10 may also be provided to a slicer 125, which slices the sheet into sections or strips having desired widths, e.g., 15". The insulation products 50 so formed are then transported to packaging equipment (not shown). If the slicer 125 is disposed prior to application of facing 31, facing layer 31 is provided from separate rolls 108 spaced to provide an individual facing layer 31 of appropriate width to each sliced section of sheet 10.

The system described above was tested on a pilot line with the speed of the conveyor 104 conveying sheet 10 beneath the fiber dispensing chamber 102 varied from about 15 ft/min to about 80 feet/min. The system was also tested on an existing fiberglass matt production line with conveying speeds of about 70 ft/min and 95 ft/min. In both tests, a layer of randomly oriented bicomponent fiber was deposited and observed firmly bonded to a fiberglass mat. The test system included a Volu-matic-II blowing machine manufactured by Unisol (Florida, United States), 100 feet of 4" diameter corrugated hose and a separating chamber made from cardboard with dimensions about 2 feet wide, 4 feet high and 4 feet in length. Three 600 kW infrared (IR) heaters were aligned along the line about 2 inches above the fiberglass mat for melting the sheath in the bicomponent plastic fiber deposited thereon from the chamber. In both tests, a layer of randomly oriented bicomponent fiber CELBOND® Type 255 2.0 denier (0.16" and 0.25" fiber length) was observed deposited and firmly bonded to the fiberglass mat. The layer was observed to have good uniformity and was smooth to the touch. It was surprisingly noticed that even with only 0.7 gr/ft$^2$ of bicomponent plastic fiber, the sample produced on the existing fiberglass matt production line provided was much softer to the touch than the controlled sample. An improvement in thickness recovery and tension strength of the finished product are expected due to the presence of the 0.1 inch or thicker bicomponent fiber nonwoven layer.

From the foregoing it can be realized that this disclosure provides improved methods of making insulation product containing nonwoven layers produced in situ on one or more surfaces of the insulation material. In situ forming through deposition of bicomponent fiber and subsequent processing, is extremely efficient, requires less inventory, and produces an air permeable, smooth, durable and water vapor permeable surface that is particularly desirable for an inorganic fiber insulation product. Improved adherence of the nonwoven layer to the insulation sheet may also be achieved.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A system for manufacturing an insulation product comprising:
    a conveyor for conveying an insulation sheet containing randomly oriented fibers bonded together, said sheet having first and second major surfaces and a pair of side portions;
    means for applying a layer of bicomponent fibers to at least one of said major surfaces, each of said bicomponent fibers including first component and second component portions, said means for applying being coupled to a bicomponent fiber source containing said bicomponent fibers; and
    a heater disposed to heat said layer and said sheet, thereby forming a nonwoven layer meltbonded to said at least one of said major surfaces,
    wherein said means for applying includes:
        a chamber disposed above said conveyor for depositing said bicomponent fibers onto said sheet, said chamber having a side wall, a top wall, and an opening at a bottom thereof; and
        at least one blower for transmitting said bicomponent fibers to said chamber, and
    wherein said chamber includes at least one opening on a side thereof coupled to said blower through a hose, wherein said hose is oriented at an upward orientation toward said top wall such that the bicomponent fibers are blown into said chamber at an upward orientation toward said top wall.

2. The system of claim 1, wherein said second component portion has a higher melting point than said first component portion, said heater heating said layer to a temperature at or above the melting temperature of said first component portion, whereby said first component portion of said bicomponent fibers is meltbonded to said randomly oriented fibers in said insulation sheet.

3. The system of claim 2, wherein said sheet contains mineral fibers, polymeric fibers, rotary glass fibers, textile glass fibers, stonewool fibers, or a combination thereof.

4. The system of claim 2, wherein said first component portion comprises a thermoplastic.

5. The system of claim 2, wherein said first and second component portions are selected from the group consisting of polyethylene, polypropylene, polyester, polyethylene terephthalate, polybutylene terephthalate, polycarbonate, polyamide, polyphenylene sulfide, polyolefin, PET (polyester) PEN polyester, nylon 6,6 PCT polyester, polypropylene PBT polyester, nylon 6 co-polyamides, polylactic acid polysterene, acetal polyurethane, and soluble copolyester HDPE, LLDPE.

6. The system of claim 1, wherein said top wall includes an air filter configured to block said bicomponent fibers from escaping through said top wall.

7. A system for applying a facing layer to an insulation product comprising:
    a conveyor for conveying an insulation product, said insulation product comprising an insulation mat or board containing randomly oriented fibers bonded together, said product having first and second major surfaces and a pair of side portions;
    means for depositing bicomponent fibers onto said first major surface of said insulation product to form a layer of bicomponent fibers, thereon, each of said bicomponent fibers including first component and second component portions, said means for depositing being coupled to a bicomponent fiber source containing said bicomponent fibers; and
    a heater disposed to heat said deposited layer of bicomponent fibers, thereby forming a nonwoven facing layer meltbonded to said first major surface, wherein said means for depositing includes:
a chamber disposed above said conveyor for depositing said bicomponent fibers onto said insulation product, said chamber having a side wall, a top wall, and an opening at a bottom thereof; and
at least one blower for transmitting said bicomponent fibers to said chamber, and
wherein said chamber includes at least one opening on a side thereof coupled to said blower through a hose, wherein said hose is oriented at an upward orientation toward said top wall.

8. The system of claim 7, wherein said second component portion has a higher melting point than said first component portion, said heater heating said layer to a temperature at or above the melting temperature of said first component portion but below the melting temperature of said second component portion, whereby said first component portion of said bicomponent fibers is meltbonded to said randomly oriented fibers in said insulation product.

9. The system of claim 8, wherein said first component portion comprises a thermoplastic.

10. The system of claim 8, wherein said first and second component portions are selected from the group consisting of polyethylene, polypropylene, polyester, polyethylene terephthalate, polybutylene terephthalate, polycarbonate, polyamide, polyphenylene sulfide, polyolefin, PET (polyester) PEN polyester, nylon 6,6 PCT polyester, polypropylene PBT polyester, nylon 6 co-polyamides, polylactic acid polysterene, acetal polyurethane, and soluble copolyester HDPE, LLDPE.

11. The system of claim 7, wherein said bicomponent fibers comprise sheath-core bicomponent fibers, side-by-side bicomponent fibers, islands-in-the-sea bicomponent fibers, cospun fibers, or a combination thereof.

12. The system of claim 7, wherein said top wall includes an air filter configured to block said bicomponent fibers from escaping through said top wall.

13. The system of claim 7, wherein said bicomponent fibers are deposited on said insulation product in an amount less than or equal to 2.5 grams/ft$^2$.

14. A system for applying a facing layer to an insulation product comprising:
a conveyor for conveying an insulation product, said insulation product comprising an insulation mat or board containing randomly oriented fibers bonded together, said product having first and second major surfaces and a pair of side portions;
a bicomponent fiber deposition chamber disposed over said conveyor, said bicomponent fiber deposition chamber positioned to deposit bicomponent fibers onto said first major surface of said insulation product to form a layer of bicomponent fibers thereon, each of said bicomponent fibers including first component and second component portions;
a source containing bicomponent fibers coupled to said bicomponent fiber deposition chamber; and
a heater disposed to heat said deposited layer of bicomponent fibers, thereby forming a nonwoven facing layer meltbonded to said first major surface,
wherein said second component portion has a higher melting point than said first component portion, said heater heating said layer to a temperature at or above the melting temperature of said first component portion but below the melting temperature of said second component portion, whereby said first component portion of said bicomponent fibers is meltbonded to said randomly oriented fibers in said insulation product,
wherein said bicomponent fibers comprise sheath-core bicomponent fibers, side-by-side bicomponent fibers, islands-in-the-sea bicomponent fibers, cospun fibers, or a combination thereof, and
wherein said bicomponent fiber deposition chamber includes at least one opening on a side thereof coupled to a blower through a hose, wherein said hose is oriented at an upward orientation toward a top wall of said bicomponent fiber deposition chamber.

15. The system of claim 14, wherein said first component portion comprises a thermoplastic.

16. The system of claim 14, wherein said first and second component portions are selected from the group consisting of polyethylene, polypropylene, polyester, polyethylene terephthalate, polybutylene terephthalate, polycarbonate, polyamide, polyphenylene sulfide, polyolefin, PET (polyester) PEN polyester, nylon 6,6 PCT polyester, polypropylene PBT polyester, nylon 6 co-polyamides, polylactic acid polysterene, acetal polyurethane, and soluble copolyester HDPE, LLDPE.

17. The system of claim 14, wherein said bicomponent fibers are deposited on said insulation product in an amount less than or equal to 2.5 grams/ft$^2$.

18. A system for applying a facing layer to an insulation product comprising:
a conveyor for conveying an insulation product, said insulation product comprising an insulation mat or board containing randomly oriented fibers bonded together, said product having first and second major surfaces and a pair of side portions;
a bicomponent fiber deposition chamber disposed over said conveyor, said bicomponent fiber deposition chamber positioned to deposit bicomponent fibers onto said first major surface of said insulation product to form a layer of bicomponent fibers thereon, each of said bicomponent fibers including first component and second component portions, wherein said bicomponent fiber deposition chamber includes at least one opening on a side thereof coupled to a blower, wherein said bicomponent fibers are blown into said bicomponent fiber deposition chamber by said blower through said at least one opening on said side of said bicomponent fiber deposition chamber in an air stream having an upward orientation directed toward a top wall of said bicomponent fiber deposition chamber, wherein said blower is coupled to said at least one opening on said side of said bicomponent fiber deposition chamber through a conduit, wherein said conduit is oriented at an upward orientation toward the top wall of said bicomponent fiber deposition chamber;
a source containing bicomponent fibers coupled to said blower; and
a heater disposed to heat said deposited layer of bicomponent fibers, thereby forming a nonwoven facing layer meltbonded to said first major surface.

19. The system of claim 18, wherein said second component portion has a higher melting point than said first component portion, said heater heating said layer to a temperature at or above the melting temperature of said first component portion but below the melting temperature of said second component portion, whereby said first component portion of said bicomponent fibers is meltbonded to said randomly oriented fibers in said insulation product.

20. The system of claim 18, wherein said bicomponent fibers comprise sheath-core bicomponent fibers, side-by-side bicomponent fibers, islands-in-the-sea bicomponent fibers, or cospun fibers.

* * * * *